United States Patent
Hirono

(10) Patent No.: US 9,246,420 B2
(45) Date of Patent: Jan. 26, 2016

(54) MOTOR CONTROL DEVICE

(75) Inventor: Daisuke Hirono, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 257 days.

(21) Appl. No.: 14/113,357

(22) PCT Filed: Mar. 1, 2012

(86) PCT No.: PCT/JP2012/055224
§ 371 (c)(1),
(2), (4) Date: Oct. 22, 2013

(87) PCT Pub. No.: WO2012/144276
PCT Pub. Date: Oct. 26, 2012

(65) Prior Publication Data
US 2014/0049201 A1 Feb. 20, 2014

(30) Foreign Application Priority Data

Apr. 22, 2011 (JP) ................................. 2011-095661

(51) Int. Cl.
*H02P 1/52* (2006.01)
*H02P 6/18* (2006.01)
*H02P 6/10* (2006.01)
*H02P 1/16* (2006.01)
*H02P 1/46* (2006.01)
(Continued)

(52) U.S. Cl.
CPC *H02P 6/10* (2013.01); *H02P 1/166* (2013.01); *H02P 1/46* (2013.01); *H02P 6/182* (2013.01); *H02P 6/20* (2013.01); *H02P 23/0063* (2013.01)

(58) Field of Classification Search
CPC ................ H02P 1/46; H02P 1/52; H02P 6/18

USPC ........... 318/400.03, 400.11, 400.32, 430, 431
See application file for complete search history.

(56) References Cited

U.S. PATENT DOCUMENTS

| 4,565,957 A * | 1/1986 | Gary ........................ H02P 1/50 318/722 |
| 5,783,917 A * | 7/1998 | Takekawa ............... H02P 6/205 318/400.1 |
| 6,642,681 B2 * | 11/2003 | Kawabata ................. H02P 1/46 318/431 |

(Continued)

FOREIGN PATENT DOCUMENTS

| JP | 2003-333886 | 11/2003 |
| JP | 2004-222382 | 8/2004 |

(Continued)

*Primary Examiner* — Bentsu Ro
(74) *Attorney, Agent, or Firm* — Cozen O'Connor

(57) ABSTRACT

Proposed is a motor control device that executes rotational control that follows load fluctuations in a startup mode. The proposed motor control device is provided with: detection means 4 that detects a current peak value Ip and a current electrical angle θi based on phase currents Iu to Iw; detection means 5 that detects an induced voltage peak value Ep and an induced voltage electrical angle θe based on phase currents Iu to Iw and applied voltages Vu to Vw; rotor position detection means 6 that detects a rotor position θm using θm=θi−β−90° or θm=θe−γ−90°; velocity fluctuation detection means 15 that detects a rotational velocity ω based on this θm; and startup means 10 that outputs a startup voltage instruction value Vp and a startup voltage phase instruction value θv, increases the rotational velocity of the synchronous motor M with predetermined acceleration, and makes the rotational velocity ω detected by the velocity fluctuation detection means 15 be reflected in θv.

9 Claims, 3 Drawing Sheets

(51) Int. Cl.
*H02P 6/20* (2006.01)
*H02P 23/00* (2006.01)

(56) References Cited

U.S. PATENT DOCUMENTS 7,227,326 B1   6/2007   Lu et al.
7,932,691 B2 * 4/2011   Son ........................... H02P 1/46
                                                      318/400.03
2005/0057204 A1   3/2005   Hirono
2012/0161688 A1 * 6/2012   Tamai ...................... H02P 1/52
                                                      318/721

FOREIGN PATENT DOCUMENTS

| JP | 2005-94853 | 4/2005 |
| JP | 2011-10438 | 1/2011 |
| JP | 2011-24401 | 2/2011 |

* cited by examiner

MOTOR CONTROL DEVICE

RELATED APPLICATIONS

This application is a U.S. National Phase Application under 35 USC 371 of International Application PCT/JP2012/055224 filed Mar. 1, 2012.

This application claims the priority of Japanese application No. 2011-095661 filed Apr. 22, 2011, the entire content of which are hereby incorporated by reference.

TECHNICAL FIELD

Technology concerning startup control of a synchronous motor is disclosed below.

BACKGROUND ART

In a sine wave drive system (a 180-degree energizing system) that has been increasingly adopted in application examples as a synchronous motor (permanent magnet synchronous motor) drive system, a rotor position (a rotation position of a rotor) is detected in a sensorless manner, and control for effecting appropriate energization of a stator coil is executed. As such a motor control device having a function of detecting a rotor position in a sensorless manner, a motor control device disclosed in Patent Document 1 is proposed. The motor control device in Patent Document 1 enables detection of a rotor position θm with a constant accuracy and a low processing load in a normal operation mode (positional detection operation) of the synchronous motor.

The synchronous motor has a startup mode (forced commutation operation) as a preliminary stage to a normal operation mode, and in this startup mode, since an estimated error of a rotor position θm representing an angle of d axis in a rotor coordinate system (an absolute position of the rotor) relative to α axis in a stator coordinate system becomes high, a position detection operation based on the rotor position θm is not performed. Thus, in the startup mode, the synchronous motor is started by a motor control device disclosed in Patent Document 2. Upon receiving an operation instruction including a target rotational velocity (a target number of revolutions) in a motor-stopped state, the motor control device in Patent Document 2 starts driving with an applied voltage and an applied voltage phase that are set by a startup voltage setting unit and a startup phase setting unit, whereby a rotational velocity is gradually increased with constant acceleration. When the rotational velocity reaches a predetermined value lower than a target rotational velocity, it is deemed that the startup is completed, and control for transition to the normal operation mode is executed. In this configuration, no computing device having a high processing capacity is necessary, and end of startup can be simplified and secured.

PATENT DOCUMENTS

Patent Document 1: Japanese Laid-Open Patent Publication No. 2011-10438
Patent Document 2: Japanese Laid-Open Patent Publication No. 2005-94853

SUMMARY OF THE INVENTION

Problems to be Solved by the Invention

As described above, in the startup mode of the synchronous motor, since a detection accuracy of a rotor position is poor, forced drive for gradually increasing a rotational velocity with constant acceleration is executed without detecting a rotor position. However, in this mode, when a load imposed on an output shaft of the synchronous motor fluctuates, especially instantaneously fluctuates, loss of rotation may possibly occur and startup may take time.

Such a fluctuation of load in the startup mode may occur particularly in a compressor of an air conditioner using a synchronous motor. For example, when drops of a refrigerant enter into a cylinder of the compressor, load of a compression stroke increases. On the other hand, since load of an intake stroke is the same as usual, a load applied to the synchronous motor in the startup mode in this case fluctuates according to the compression/intake stroke of the compressor.

A motor control device disclosed in Patent Document 2 executes a forced control with constant acceleration in a startup mode irrespective of load, and hence, it is not applicable to the case where the load fluctuates. In view of the above-described technical background, it is necessary to make some ingenuity that enables the device to follow the fluctuation of load in the startup mode.

Means for Solving the Problems

A motor control device proposed to address this problem comprises:

a current detection means for detecting a current flowing through a stator coil in a synchronous motor;

an applied voltage detection means for detecting an applied voltage applied to the stator coil;

a rotor position detection means for detecting a rotor position of the synchronous motor by using a predetermined rotor position computational expression including a current variable and a voltage variable that are obtained based on the current detected by the current detection means and the applied voltage detected by the applied voltage detection means;

a velocity/velocity fluctuation detection means for detecting a rotational velocity based on the rotor position detected by the rotor position detection means; and a startup means for outputting a startup voltage instruction value and a startup voltage phase instruction value in a startup mode, thereby increasing the rotational velocity of the synchronous motor driven based on the instruction values with predetermined acceleration, and making the rotational velocity detected by the velocity/velocity fluctuation detection means be reflected in the startup voltage phase instruction value.

Effects of the Invention

The rotor position detected in the motor control device according to the proposal is based on the detected present current and applied voltage, and its calculated value reflects a "difference between an induced voltage electrical angle and a current electrical angle". Therefore, a rotational velocity detected based on this rotor position fluctuates according to a fluctuation in the difference between the induced voltage electrical angle and the current electrical angle (i.e., a phase difference between an induced voltage and a current). In a motor vector diagram, in general, the difference between the induced voltage electrical angle and the current electrical angle increases as the rotor position advances, and it decreases when the rotor position is delayed. That is, from a rotational velocity that fluctuates according to the difference between the induced voltage electrical angle and the current electrical angle, it is possible to detect a relative position of the rotor indicating whether the rotor position has advanced or has been delayed in a period between previous and subsequent detections irrespective of a detection accuracy of the rotor position (an absolute position of the rotor). Further, since the fluctuation in rotational velocity, that is the fluctuation in relative position of the rotor, is considered to be associated with a fluctuation in load applied to the output shaft of the synchronous motor, by appropriately adjusting acceleration according to the fluctuation in detected rotational velocity, it becomes possible to execute a rotational control following the fluctuation in load in the startup mode.

MODE FOR CARRYING OUT THE INVENTION

Figure 1:
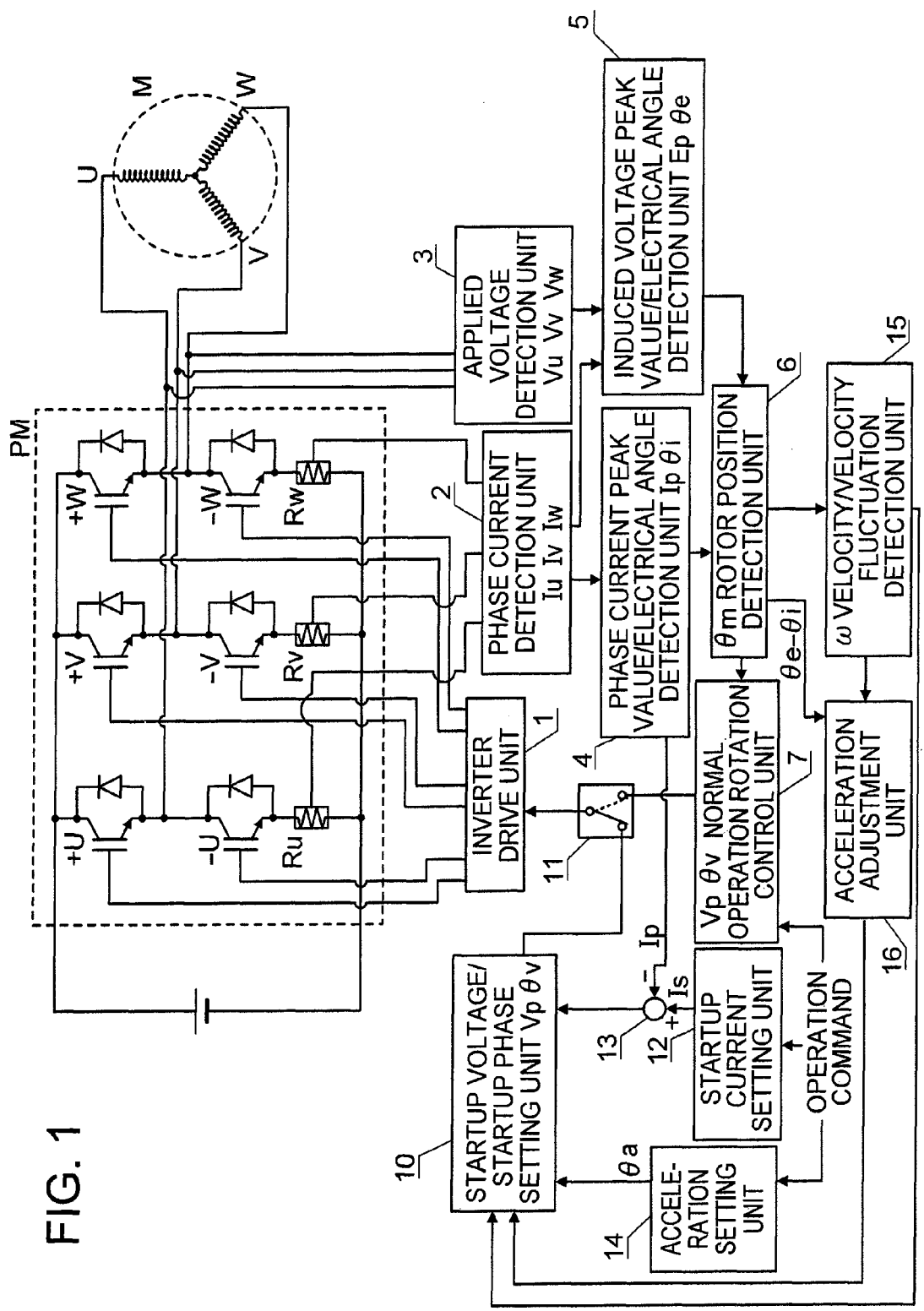
FIG. 1 is a block diagram showing an embodiment of a motor control device.

FIG. 1 shows an embodiment of a motor control device.

A synchronous motor M according to this embodiment is of a three-phase star connection type, and it has a stator including star coils having a U phase, a V phase, and a W phase and a rotor including a permanent magnet. The drawing only shows the respective stator coils having the U phase, the V phase, and the W phase, and other structures are omitted in the drawing. It is to be noted that the star connection type will be described as an example but this embodiment can be likewise applied to a delta connection type.

In a power module (IPM) PM that drives this synchronous motor, for the U, V and W phases, switching elements +U, +V, and +W on an upper arm side are connected in series with switching elements −U, −V, and −W, respectively, on a lower arm side between a high potential side and a low potential side of a direct-current power supply. Further, shunt resistances Ru, Rv, and Rw configured to detect currents flowing in the respective phases are provided on the low potential side of the switching elements −U, −V, and −W on the lower arm side. The switching elements +U to −W are driven by PWM signals from an inverter drive unit 1, and consequently, the stator coils in the U phase, the V phase, and the W phase are controlled based on sine wave energization (180-degree energization). Currents flowing through the phases U, V, and W based on this control are detected by using the shunt resistances Ru, Rv, and Rw, respectively.

In this embodiment, description will be given based on the assumption that the inverter drive unit 1 and other units explained below are executed by a computer, such as a microcomputer that operates according to a program. However, the present invention is not restricted thereto, and each unit may be constituted by using hardware.

A phase current detection unit 2 corresponding to the current detection means detects a U phase current Iu flowing through the stator coil in the U phase, a V phase current Iv flowing through the stator coil in the V phase, and a W phase current Iw flowing through the stator coil in the W phase by measuring voltages applied to the shunt resistances Ru, Rv, and Rw, respectively. An applied voltage detection unit 3 corresponding to the applied voltage detection means detects a U phase applied voltage Vu, a V phase applied voltage Vv, and a W phase applied voltage Vw applied to the stator coil in the U phase, the stator coil in the V phase, and the stator coil in the W phase from the switching elements +U to +W on the upper arm side, respectively.

A phase current peak value/electrical angle detection unit 4 corresponding to the current peak value/electrical angle detecting means detects a phase current peak value Ip and a phase current electrical angle $\theta i$ based on values of the phase currents Iu, Iv, and Iw detected by the phase current detection unit 2. Its detection method is as follows. The detection method is described in Patent document 1 in detail.

Figure 2A:
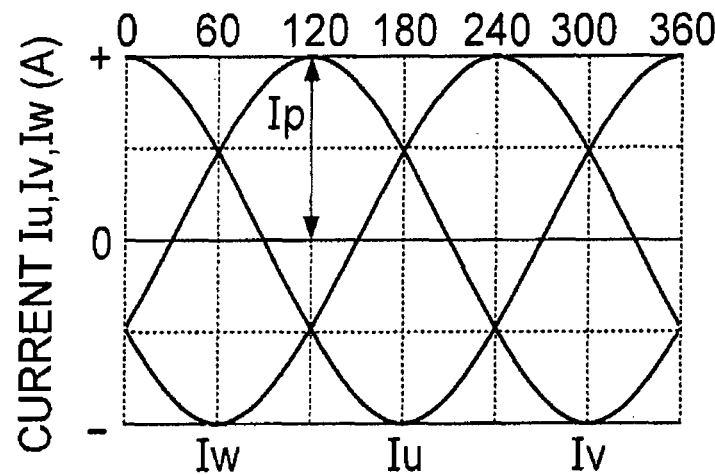
FIGS. 2A and 2B are respective waveform charts of a current and an induced voltage in sine wave energization.

A phase current waveform chart at the time of performing sine wave energization to each of the U phase, the V phase, and the W phase is as shown in FIG. 2A, and in this chart, the U phase current Iu, the V phase current Iv, and the W phase current Iw forming sine waveforms have phase differences of 120°. Based on this phase current waveform chart, the following Expression 1 is satisfied among the phase currents Iu, Iv, and Iw, the phase current peak value Ip, and the phase current electrical angle $\theta i$. The phase current peak value/electrical angle detection unit 4 obtains the phase current peak value Ip and the phase current electrical angle $\theta i$ by using the U phase current Iu, the V phase current Iv, and the W phase current Iw detected by the phase current detection unit 2 based on Expression 1.

$$Iu = Ip \times \cos(\theta i)$$

$$Iv = Ip \times \cos(\theta i - 2/3\pi)$$

$$Iw = Ip \times \cos(\theta i + 2/3\pi) \quad \text{[Expression 1]}$$

An induced voltage peak value/electrical angle detection unit 5 corresponding to the induced voltage peak value/electrical angle detection means detects an induced voltage peak value Ep and an induced voltage electrical angle $\theta e$ based on the phase currents Iu, Iv, and Iw detected by the phase current detection unit 2 and the applied voltages Vu, Vv, and Vw detected by the applied voltage detection unit 3. Its detection method is as follows. This detection method is likewise explained in Patent Document 1 in detail.

Figure 2B:
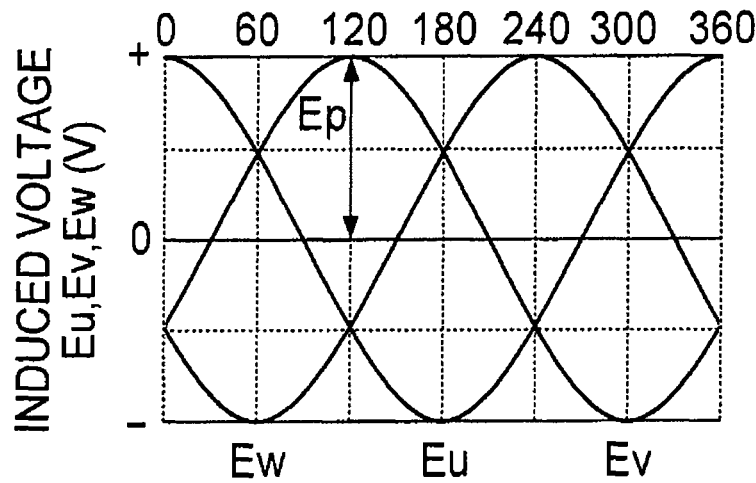

An induced voltage waveform chart at the time of performing sine wave energization to each of the U phase, the V phase, and the W phase is as shown in FIG. 2B, and in this chart, the U phase induced voltage Eu, the V phase induced voltage Ev, and the W phase induced voltage Ew forming sine waveforms have phase differences of 120°. Based on this induced voltage waveform chart, the following Expression 2 is satisfied among the induced voltage Eu, Ev, and Ew, the induced voltage peak value Ep, and the induced voltage electrical angle $\theta e$.

$$Eu = Ep \times \cos(\theta e)$$

$$Ev = Ep \times \cos(\theta e - 2/3\pi)$$

$$Ew = Ep \times \cos(\theta e + 2/3\pi) \quad \text{[Expression 2]}$$

On the other hand, the following Expression 3 is satisfied among the applied voltages Vu, Vv, and Vw, the phase currents Iu, Iv, and Iw, the resistance values Rcu, Rcv, and Rcw of the stator coils, and the induced voltages Eu, Ev, and Ew.

$$Vu - Iu \times Rcu = Eu$$

$$Vv - Iv \times Rcv = Ev$$

$$Vw - Iw \times Rcw = Ew \quad \text{[Expression 3]}$$

The induced voltage peak value/electrical angle detection unit 5 obtains the U phase induced voltage Eu, the V phase induced voltage Ev, and the W phase induced voltage Ew from Expression 3 based on the U phase current Iu, the V phase current Iv, and the W phase current Iw detected by the phase current detection unit 2 and the U phase applied voltage Vu, the V phase applied voltage Vv, and the W phase applied voltage Vw detected by the applied voltage detection unit 3, and further obtains the induced voltage peak value Ep and the induced voltage electrical angle θe from Expression 2 based on the U phase induced voltage Eu, the V phase induced voltage Ev, and the W phase induced voltage Ew acquired above.

A rotor position detection unit 6 corresponding to the rotor position detection means detects a rotor position θm (an angle of d axis relative to a axis) based on the phase current peak value Ip and the phase current electrical angle θi detected by the phase current peak value/electrical angle detection unit 4 and the induced voltage peak value Ep and the induced voltage electrical angle θe detected by the induced voltage peak value/electrical angle detection unit 5 as current variables and voltage variables. That is, the rotor position θm of the synchronous motor M is detected by using a rotor position computational expression including the current electrical angle θi or the induced voltage electrical angle θe as a variable and also including as a variable a current phase β or an induced voltage phase γ obtained based on the current peak value Ip or the induced voltage peak value Ep and a difference [θe−θi] between the induced voltage electrical angle θe and the current electrical angle θi (see Patent Document 1 for more detail).

Among these methods, specific description will be given as to a first detection method using the rotor position computational expression including the phase current electrical angle θi, the phase current peak value Ip, and the current phase β based on [the induced voltage electrical angle θe−the phase current electrical angle θi] as variables and a second detection method using the rotor position computational expression including the induced voltage electrical angle θe, the phase current peak value Ip, and the induced voltage phase γ based on [the induced voltage electrical angle θe−the phase current electrical angle θi] as variables.

(1) First Detection Method

In the first detection method, the rotor position computational expression including the detected phase current electrical angle θi and the current phase β as variables is the following Expression 4.

$$\theta m = \theta i - \beta - 90° \quad \text{[Expression 4]}$$

The current phase β in Expression 4 is selected with reference to a preliminarily prepared data table using the phase current peak value Ip and [the induced voltage electrical angle θe−the phase current electrical angle θi] as parameters. This data table has been prepared and stored in a memory as follows.

Figure 3A:
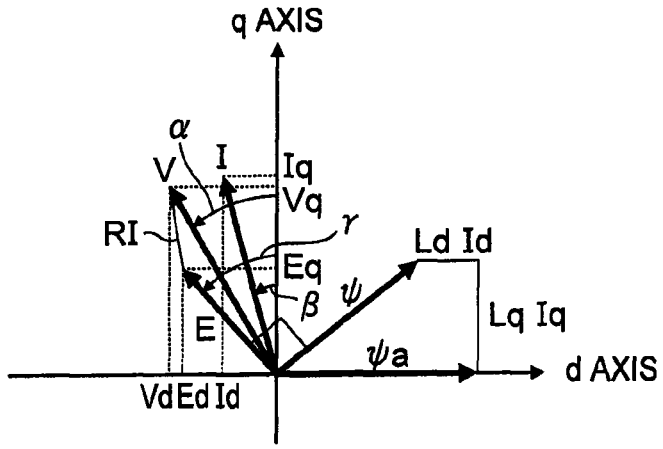
FIGS. 3A, 3B and 3C are vector diagrams of a synchronous motor.

In regard to creation of the data table, FIG. 3A is a motor vector diagram when the rotor of the synchronous motor M is rotating, which illustrates the relationships among an applied voltage V (Vu to Vw), a current I (Iu to Iw), and an induced voltage E (Eu to Ew) as vectors in a d-q coordinate system. The induced voltage E is represented as [ωψ]. Further, in FIG. 3A, Vd is a d axis component of the applied voltage V, Vq is a q axis component of the applied voltage V, Id is a d axis component of the current I, Iq is a q axis component of the current I, Ed is a d axis component of the induced voltage E, and Eq is a q axis component of the induced voltage E. Furthermore, a voltage phase from q axis is α, a current phase from q axis is β, and an induced voltage phase from q axis is γ. ψa in the drawing is a magnetic flux of a permanent magnet of the rotor, Ld is a d axis inductance, Lq is a q axis inductance, R is a resistance value (Rcu to Rcw) of each stator coil, and ψ is a total interlinkage flux of the rotor.

Based on this motor vector diagram, when a rotational velocity of the rotor is determined as ω, the following Expression 5 is obtained. When each value concerning ω is shifted from the right side to the left side in Expression 5, Expression 6 is obtained.

$$\begin{pmatrix} Vd \\ Vq \end{pmatrix} \equiv \begin{pmatrix} R - \omega Lq \\ \omega Ld \ R \end{pmatrix} \begin{pmatrix} Id \\ Iq \end{pmatrix} + \begin{pmatrix} O \\ \omega\psi a \end{pmatrix} \quad \text{[Expression 5]}$$

$$\begin{pmatrix} Ed/\omega = (Vd - Id \times R)/\omega \\ Eq/\omega = (Vq - Iq \times R)/\omega \end{pmatrix} = \begin{pmatrix} O - Lq \\ Ld \ O \end{pmatrix} \begin{pmatrix} Id \\ Iq \end{pmatrix} + \begin{pmatrix} O \\ \psi a \end{pmatrix} \quad \text{[Expression 6]}$$

As described above, the data table is created in advance based on the assumption that Expression 5 and Expression 6 are satisfied in the motor vector diagram of FIG. 3A. That is, each of the current phase β and the current I shown in the motor vector diagram is gradually increased in a predetermined range, and the current phase β is stored when [the induced voltage phase γ−the current phase β] becomes a predetermined value, thereby creating the data table of the current phase β using the phase current wave value Ip corresponding to the current I and [the induced voltage electrical angle θe−the phase current electrical angle θi] corresponding to [the induced voltage phase γ−the current phase β] as parameters.

In more detail, as shown in, e.g., FIG. 5 of Patent Document 1 mentioned above, while the current phase β is increased from −180° to 180° in increments of 0.001° and the current I is increased from 0 A to 64 A in increments of 1 A, the voltage phase α, the current phase β, and the induced voltage phase γ are obtained based on the motor vector diagram by using the d axis inductance Ld and the q axis inductance Lq intrinsic to the synchronous motor M. Thereafter, the current phase β when [the induced voltage phase γ−the current phase β] is 1°, 2°, 3°, ... is stored. As a result, there is created the data table of the current phase β, which uses the phase current peak value Ip corresponding to the current I as one parameter and [the induced voltage electrical angle θe−the phase current electrical angle θi] corresponding to [the induced voltage phase γ−the current phase β] as another parameter.

When the current phase β and the phase current electrical angle θi selected from this data table are assigned to Expression 4 being the rotor position computational expression, the rotor position θm is detected.

(2) Second Detection Method

In the second detection method, the rotor position computational expression including the detected induced voltage electrical angle θe and the induced voltage phase γ as variables is the following Expression 7.

$$\theta m = \theta e - \gamma - 90° \quad \text{[Expression 7]}$$

The induced voltage phase γ in Expression 7 is selected with reference to a preliminarily prepared data table using the phase current peak value Ip and [the induced voltage electrical angle θe−the phase current electrical angle θi] as parameters. This data table has been prepared and stored in the memory in the following manner.

The data table in this case is also created in advance based on the assumption that Expression 5 and Expression 6 are satisfied in the motor vector diagram of FIG. 3A. That is, each of the current phase β and the current I shown in the motor vector diagram is gradually increased in a predetermined range, and the induced voltage phase γ when [the induced voltage phase γ−the current phase β] is a predetermined value is stored, thereby creating the data table of the induced voltage phase γ using the phase current peak value Ip corresponding to the current I and [the induced voltage electrical angle θe–the phase current electrical angle θi] corresponding to [the induced voltage phase γ–the current phase β] as parameters.

In more detail, like the above description, while the current phase β is increased from −180° to 180° in increments of 0.001° and the current I is increased from 0 A to 64 A in increments of 1 A, the voltage phase α, the current phase β, and the induced voltage phase γ are obtained based on the motor vector diagram by using the d axis inductance Ld and the q axis inductance Lq intrinsic to the synchronous motor M. Thereafter, the induced voltage phase γ when [the induced voltage phase γ–the current phase β] is 1°, 2°, 3°, . . . is stored. As a result, there is created the data table of the induced voltage phase γ, which uses the phase current peak value Ip corresponding to the current I as one parameter and [the induced voltage electrical angle θe–the phase current electrical angle θi] corresponding to [the induced voltage phase γ–the current phase β] as another parameter.

When the induced voltage phase γ and the induced voltage electrical angle θe selected from this data table are assigned to Expression 7 being the rotor position computational expression, the rotor position θm is detected.

According to the rotor position detection unit 6 that executes the first and second detection methods, since the rotor position θm is directly obtained by using the rotor position computational expression, the rotor position θm can be accurately detected in the normal operation mode. Further, since the unit employs the system that selects the current phase β or the induced voltage phase γ as one of variables included in the rotor computational expression from the data table prepared in advance, a processing load is lower than that in case of obtaining the current phase β or the induced voltage phase γ by the calculation each time. However, when the processing load does not have to be considered, the variables may be calculated each time.

In the first and second detection methods described above, the tables from which the current phase β or the induced voltage phase γ is selected by using the phase current peak value Ip and [the induced voltage electrical angle θe–the phase current electrical angle θi] as parameters, have been exemplified as the data tables. Besides these data tables, it is possible to likewise use any one of a data table from which the current phase β or the induced voltage phase γ is selected by using the induced voltage peak value Ep and [the induced voltage electrical angle θe–the phase current electrical angle θi] as parameters and a data table from which the current phase β or the induced voltage phase γ is selected by using the phase current peak value Ip, the inducted voltage peak value Ep, and [the induced voltage electrical angle θe–the phase current electrical angle θi] as parameters.

The rotor position θm detected by such a rotor position detection unit 6 is input to a normal operation rotation control unit 7. The normal operation rotation control unit 7 outputs a voltage instruction value Vp and a voltage phase instruction value θv based on an operation command input from the outside and the rotor position θm. In the normal operation mode, the voltage instruction value Vp and the voltage phase instruction value θv are supplied to the inverter drive unit 1, and a PWM signal associated with these values is output from the inverter drive unit 1 to a power module PM.

In the normal operation mode, the rotor position θm detected by the rotor position detection unit 6 is used, and a position detecting operation is executed by the normal operation rotation control unit 7. However, in a startup mode, since a detection accuracy for the rotor position θm is poor, later-described startup means executes rotational control.

A startup voltage/starting phase setting unit 10 corresponding to the startup means in this embodiment outputs a startup voltage instruction value Vp and a startup voltage phase instruction value θv in the startup mode. These instruction values Vp and θv are supplied to the inverter drive unit 1 through a mode changeover switch 11, a PWM signal is output from the inverter drive unit 1, and the synchronous motor M is driven by the power module PM. In regard to a startup rotational speed of the synchronous motor M driven based on the directed values Vp and θv in this manner, the startup voltage/starting phase setting unit 10 increases the speed with predetermined acceleration, e.g., 1 rpm/1 msec. The mode changeover switch 11 supplies the instruction values Vp and θv output from the normal operation rotation control unit 7 to the inverter drive unit 1 in the normal operation mode, and the switch supplies the instruction values Vp and θp output from the startup voltage/starting phase setting unit 10 to the inverter drive unit 1 in the startup mode.

The startup voltage/starting phase setting unit 10 generates a startup voltage instruction value Vp representing an applied voltage peak value in the startup mode by PI control or P control according to a startup current value Is output from a startup current setting unit 12. Upon receiving an operation command including a target rotational velocity in a motor stop state, the startup current setting unit 12 sets a current value corresponding to the maximum output torque as the startup current value Is. At the time of starting up the synchronous motor M, since necessary torque is not clear, a maximum current value available with use of the power module PM is set to the startup current value Is.

The startup current value Is output from the startup current setting unit 12 is corrected by an addition unit 13 and then input to the startup voltage/starting phase setting unit 10. The phase current peak value Ip is input to the addition unit 13 from the phase current peak value/electrical angle detection unit 4, and the phase current peak value Ip is fed back with respect to the startup current value Is, so that the startup current value Is input to the startup voltage/starting phase setting unit 10 is appropriately maintained.

The startup voltage/starting phase setting unit 10 generates a startup voltage phase instruction value θv representing an applied voltage phase in the startup mode according to constant angular acceleration θa output from an acceleration setting unit 14. When the acceleration setting unit 14 receives an operation command including a target rotational velocity in the motor stop state, it outputs the constant angular acceleration θa to the startup voltage/starting phase setting unit 10 according to this command. Further, when "θa×elapsed time t" becomes the target rotational velocity included in the operation command or reaches a predetermined value lower than the target rotational velocity included in the operation command as described in Patent Document 2, the acceleration setting unit 14 changes over the mode changeover switch 11 to enter the normal operation mode using the normal operation rotation control unit 7.

At the time of generating the startup voltage phase instruction value θv according to this angular acceleration θa, the startup voltage/starting phase setting unit 10 sets the startup voltage phase instruction value θv so as to reflect a rotational velocity (an angular velocity) ω of the rotor detected by a velocity/velocity fluctuation detection unit 15. The velocity/velocity fluctuation detection unit 15 corresponding to velocity/velocity fluctuation detection means detects the rotational velocity ω by using dθm/dt based on the rotor position θm detected by the rotor position detection unit 6. The startup voltage/starting phase setting unit 10 utilizes the angular acceleration θa and (an angle corresponding to) the detected rotational velocity ω and sets the startup voltage phase instruction value θv based on the following Expression 8. In this expression, θv(−1) represents a previous startup voltage phase instruction value θv and Δt represents a control period.

$$\theta v = \theta v(-1) + [\theta a \Delta t + \omega] \Delta t \quad \text{[Expression 8]}$$

In this manner, the startup voltage/starting phase setting unit 10 sets the startup voltage phase instruction value θv so as to reflect the rotational velocity ω of the rotor detected by the velocity/velocity fluctuation detection unit 15. Since a fluctuation in rotational velocity ω is considered to be associated with a fluctuation in load applied to the output shaft of the synchronous motor M, by appropriately adjusting acceleration according to a fluctuation in detected rotational velocity ω, it becomes possible to execute rotational control following the fluctuation in load in the startup mode.

The rotor position θm detected by the rotor position detection unit 6 is a calculated value that reflects [the induced voltage electrical angle θe−the current electrical angle θi]. Therefore, the rotational velocity ω detected based on the rotor position θm in the velocity/velocity fluctuation detection unit 15 fluctuates according to a fluctuation in [the induced voltage electrical angle θe−the current electrical angle θi]. As regards this point, a description will be given with reference to FIG. 3B and FIG. 3C. Each of FIG. 3B and FIG. 3C is a motor vector diagram under the current I controlled to be constant in the startup mode.

Figure 3B:
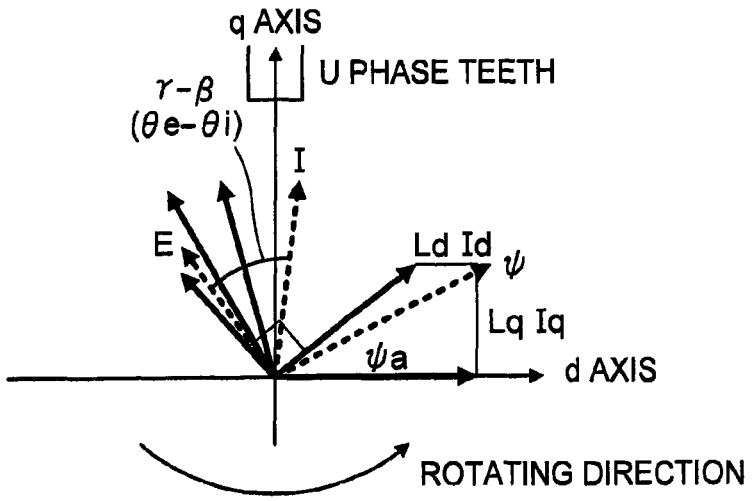
Figure 3C:
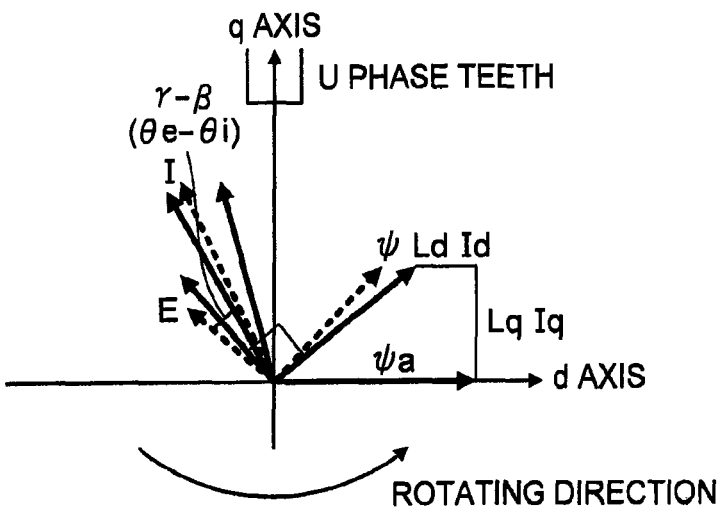

In FIG. 3B and FIG. 3C, each vector of solid line represents a present phase, and each vector of dotted line represents a target phase. Referring to FIG. 3B, it can be understood that [the induced voltage electrical angle θe−the current electrical angle θi] increases as the rotor position θm advances. On the other hand, referring to FIG. 3C, it can be understood that [the induced voltage electrical angle θe−the current electrical angle θi] decreases as the rotor position θm is delayed. That is, from the rotational velocity ω that fluctuates according to [the induced voltage electrical angle θe−the current electrical angle θi], it is possible to detect a relative position Δθm of the rotor representing whether the rotor position θm has advanced or has been delayed in a period between previous and subsequent detections irrespective of a detection accuracy of the rotor position θm. Since it can be considered that this fluctuation in rotational velocity ω, that is the relative positional fluctuation Δθm of the rotor, is associated with the a fluctuation in load applied to the output shaft of the synchronous motor M, by appropriately adjusting acceleration according to a fluctuation in detected rotational velocity ω, it is possible to execute a rotational control following the fluctuation in load in the startup mode.

An acceleration limitation according to a load can be applied to the setting of the startup voltage phase instruction value θv determined by the startup voltage/starting phase setting unit 10. An acceleration adjustment unit 16 corresponding to the acceleration adjustment means is provided to execute this acceleration adjustment. When an amount of fluctuation in rotational velocity ω detected by the velocity/velocity fluctuation detection unit 15 exceeds a predetermined threshold value ωth, the acceleration adjustment unit 16 adjusts the startup voltage phase instruction value θv so as to decrease the rotational velocity ω. For example, the amount of fluctuation in rotational velocity ω can be [ω(0)−ω(−1)], where ω(0) in this expression is the latest detected rotational velocity, and ω(−1) is a previous detected rotational velocity.

The fluctuation in load in the startup mode may prominently appear in a compressor of an air conditioner using the synchronous motor M in some cases. For example, in a compressor that is cooled because of chill at night or the like, a refrigerant may be condensed and present as a liquid in a cylinder in some cases, and a liquid compression stroke occurs when the compressor is started in this state. In the liquid compression stroke, since the load is extremely heavier than that in a regular refrigerant compression stroke of a gas, load torque of the synchronous motor M that drives the compressor is high even in low-speed rotation, and it precipitously further increases as the rotational velocity ω rises. On the other hand, since the load in an intake stroke is as usual, the load applied to the synchronous motor M in this case undergoes large fluctuation according to the compression/intake stroke of the compressor.

When control of forcibly increasing the rotational velocity ω with constant acceleration is executed in such a situation that the load undergoes large fluctuation, loss of rotation occurs and startup may possibly require time. Thus, a threshold value ωth considering such a fluctuation in load is determined, and when the amount of fluctuation in rotational velocity ω exceeds this threshold value ωth, the acceleration adjustment unit 16 sets a negative angular acceleration θa' and the startup voltage/starting phase setting unit 10 sets the startup voltage phase instruction value θv in accordance with this negative angular acceleration θa'. As a result, the rotational velocity ω of the synchronous motor slows down, and the rotational velocity ω becomes a low-rotational velocity (e.g., approximately 120 rpm) that enables operation even in the liquid compression stroke, thereby avoiding the loss of rotation.

When the synchronous motor M can operate at the low-rotational velocity for a while, the liquid is then discharged since the amount of the liquid present in the cylinder in the compressor is small. When the load is thereby reduced, since the amount of fluctuation of the rotational velocity ω detected by the velocity/velocity fluctuation detection unit 15 is reduced, the acceleration adjustment unit 16 cancels the acceleration adjustment, and the normal startup mode using the angular acceleration θa set by the acceleration setting unit 14 is executed.

In the acceleration adjustment unit 16, besides the predetermined threshold value ωth, another threshold value ωth' smaller than the threshold value ωth may be set. When the amount of fluctuation in rotational velocity ω detected by the velocity/velocity fluctuation detection unit 15 exceeds the threshold value ωth', the acceleration adjustment unit 16 in this case, for example, determines the angular acceleration θa to be 0 and adjusts the startup voltage phase instruction value θv so as not to increase the rotational velocity ω. By providing an intermediate level which is the second threshold value ωth' smaller than the first threshold value ωth, it is possible to further suppress occurrence of the loss of rotation.

Besides the estimation of fluctuation in load from the fluctuation in rotational velocity ω, the acceleration adjustment unit 16 may be configured to execute the acceleration adjustment based on a fluctuation in [the induced voltage electrical angle θe−the current electrical angle θi] which can be regarded as a torque fluctuation. The acceleration adjustment unit 16 in this case receives a value of [the induced voltage electrical angle θe−the current electrical angle θi] from the rotor position detection unit 6, compares it with a stored previous value, and thereby detects the fluctuation. Additionally, when an amount of fluctuation in [the induced voltage electrical angle θe−the current electrical angle θi] exceeds a predetermined threshold value Tth that is likewise determined as described above, negative angular acceleration θa' is set, and the startup voltage/starting phase setting unit 10 sets the startup voltage phase instruction value θv according to this angular acceleration θa'. As a result, the rotational velocity w of the synchronous motor M can be reduced. Then, when the amount of fluctuation in [the induced voltage electrical angle θe–the current electrical angle θi] becomes smaller than the threshold value Tth, the acceleration adjustment unit 16 cancels the acceleration adjustment, and the normal startup mode using the angular acceleration θa set by the acceleration setting unit 14 is executed.

In the acceleration adjustment unit 16 using [the induced voltage electrical angle θe–the current electrical angle θi] besides the first threshold value Tth, a second threshold value Tth' smaller than the threshold value Tth can be set. When the amount of fluctuation in [the induced voltage electrical angle θe–the current electrical angle θi] exceeds the second threshold value Tth', the acceleration adjustment unit 16 in this case sets, e.g., the angular acceleration θa=0 and adjusts the startup voltage phase instruction value θv so as not to increase the rotational velocity ω.

In place of receiving a value of [the induced voltage electrical angle θe–the current electrical angle θi] from the rotor position detection unit 6, the acceleration adjustment unit 16 configured to use [the induced voltage electrical angle θe–the current electrical angle θi] can receive the induced voltage electrical angle θe and the current electrical angle θi from the phase current peak value/electrical angle detection unit 4 corresponding to the current electrical angle detection means and the induced voltage peak value/electrical angle detection unit 5 corresponding to the induced voltage electrical angle detection means, so that the acceleration adjustment unit 16 can detect [the induced voltage electrical angle θe–the current electrical angle θi] by itself and adjust the startup voltage phase instruction value θv. In this case, the acceleration adjustment unit 16 can operate independently from the rotor position detection unit 6 and the velocity/velocity fluctuation detection unit 15.

The configuration concerning the acceleration adjustment unit 16 can be used in combination with e.g. the motor control device disclosed in Patent Document 2 described above.

When the synchronous motor M is used for a compressor of an air conditioner, an acceleration adjustment control flow of the acceleration adjustment unit 16 can be set as follows.

First, a step of calculating a time of one revolution of the current compressor based on the rotational velocity ω detected by the velocity/velocity fluctuation detection unit 15 is executed. Then, a step of continuously detecting the maximum value and the minimum value of the rotational velocity ω or the maximum value and the minimum value of [the induced voltage electrical angle θe–the current electrical angle θi] within the time of one revolution of this compressor is executed. Furthermore, a step of comparing the difference between the maximum value and the minimum value with the threshold value ωth or ωth' or the threshold value Tth or Tth' and adjusting the acceleration as described above is executed.

REFERENCE SIGNS LIST 1 inverter drive unit
2 phase current detection unit
3 applied voltage detection unit
4 phase current peak value/electrical angle detection unit
5 induced voltage peak value/electrical angle detection unit
6 rotor position detection unit
7 normal operation rotation control unit
10 startup voltage/starting phase setting unit
11 mode changeover switch
12 startup current setting unit
13 addition unit
14 acceleration setting unit
15 velocity/velocity fluctuation detection unit
16 acceleration adjustment unit

The invention claimed is:

1. A motor control device comprising:
a current detection means for detecting a current flowing through a stator coil in a synchronous motor;
an applied voltage detection means for detecting an applied voltage applied to the stator coil;
a rotor position detection means for detecting a rotor position of the synchronous motor by using a predetermined rotor position computational expression including a current variable and a voltage variable that are obtained based on the current detected by the current detection means and the applied voltage detected by the applied voltage detection means;
a velocity/velocity fluctuation detection means for detecting a rotational velocity based on the rotor position detected by the rotor position detection means; and
a startup means for outputting a startup voltage instruction value and a startup voltage phase instruction value in a startup mode, thereby increasing the rotational velocity of the synchronous motor driven based on the instruction values with predetermined acceleration, and making the rotational velocity detected by the velocity/velocity fluctuation detection means be reflected in the startup voltage phase instruction value.

2. The motor control device according to claim 1, comprising:
an acceleration adjustment means for adjusting the startup voltage phase instruction value so that the rotational velocity of the synchronous motor is decreased when an amount of fluctuation in the rotational velocity detected by the velocity/velocity fluctuation detection means exceeds a first threshold value.

3. The motor control device according to claim 2,
wherein the acceleration adjustment means adjusts the startup voltage phase instruction value so that the rotational velocity of the synchronous motor is not increased when an amount of fluctuation in the rotational velocity detected by the velocity/velocity fluctuation detection means exceeds a second threshold value smaller than the first threshold value.

4. The motor control device according to claim 1, further comprising:
an acceleration adjustment means for adjusting the startup voltage phase instruction value so that the rotational velocity of the synchronous motor is decreased when an amount of fluctuation in difference between the induced voltage electrical angle and the current electrical angle exceeds a first threshold value.

5. The motor control device according to claim 4,
wherein the acceleration adjustment means adjusts the startup voltage phase instruction value so that the rotational velocity of the synchronous motor is not increased when the amount of fluctuation in a difference between the induced voltage electrical angle and the current electrical angle exceeds a second threshold value smaller than the first threshold value.

6. The motor control device according to claim 1, further comprising:
a current peak value/electrical angle detection means for detecting a current peak value and a current electrical angle based on the current detected by the current detection means; and an induced voltage peak value/electrical angle detection means for detecting an induced voltage peak value and an induced voltage electrical angle based on the current detected by the current detection means and the applied voltage detected by the applied voltage detection means, wherein the rotor position detection means detects the rotor position of the synchronous motor by using the rotor position computational expression including as a variable the current electrical angle or the induced voltage electrical angle and also including as a variable a current phase or an induced voltage phase obtained based on the current peak value or the induced voltage peak value and a difference between the induced voltage electrical angle and the current electrical angle.

7. A motor control device comprising:

a current detection means for detecting a current flowing through a stator coil in a synchronous motor;

an applied voltage detection means for detecting an applied voltage applied to the stator coil;

a rotor position detection means for detecting a rotor position of the synchronous motor by using a predetermined rotor position computational expression including a current variable and a voltage variable that are obtained based on the current detected by the current detection means and the applied voltage detected by the applied voltage detection means;

a velocity/velocity fluctuation detection means for detecting a rotational velocity based on the rotor position detected by the rotor position detection means;

a startup means for outputting a startup voltage instruction value and a startup voltage phase instruction value in a startup mode, and increasing the rotational velocity of the synchronous motor driven based on the instruction values with predetermined acceleration; and an acceleration adjustment means for adjusting the startup voltage phase instruction value based on an amount of fluctuation in the rotational velocity detected by the velocity/velocity fluctuation detection means.

8. The motor control device according to claim 7, further comprising:

a current peak value/electrical angle detection means for detecting a current peak value and a current electrical angle based on the current detected by the current detection means; and an induced voltage peak value/electrical angle detection means for detecting an induced voltage peak value and an induced voltage electrical angle based on the current detected by the current detection means and the applied voltage detected by the applied voltage detection means, wherein the rotor position detection means detects the rotor position of the synchronous motor by using a rotor position computational expression including as a variable the current electrical angle or the induced voltage electrical angle and also including as a variable a current phase or an induced voltage phase obtained based on the current peak value or the induced voltage peak value and a difference between the induced voltage electrical angle and the current electrical angle.

9. A motor control device comprising:

a current detection means for detecting a current flowing through a stator coil in a synchronous motor;

an applied voltage detection means for detecting an applied voltage applied to the stator coil;

a current electrical angle detection means for detecting a current electrical angle based on the current detected by the current detection means;

an induced voltage electrical angle detection means for detecting an induced voltage electrical angle based on the current detected by the current detection means and the applied voltage detected by the applied voltage detection means;

a startup means for outputting a startup voltage instruction value and a startup voltage phase instruction value in a startup mode, and increasing the rotational velocity of the synchronous motor driven based on the instruction values with predetermined acceleration; and an acceleration adjustment means for adjusting the startup voltage phase instruction value based on a difference between the induced voltage electrical angle and the current electrical angle.

* * * * *